Jan. 2, 1934.  W. M. S. KILGOUR  1,941,695

ALARM DEVICE

Filed Oct. 30, 1929

Inventor:
Walter M. S. Kilgour,
by Emery, Booth, Janney & Townsend,
Attys.

Patented Jan. 2, 1934

1,941,695

UNITED STATES PATENT OFFICE 1,941,695

ALARM DEVICE

Walter M. S. Kilgour, Lexington, Mass.

Application October 30, 1929. Serial No. 403,463

22 Claims. (Cl. 169—23)

My invention relates to alarm devices for fluid distributing systems, as for example, wet or dry pipe automatic sprinkler systems for fire protection, the present application being more particularly concerned with the valve mechanism disclosed in my co-pending application Serial No. 398,494, filed October 9, 1929.

The invention, which has among its objects the provision of an alarm device responsive to flow of fluid in the system, with avoidance of leakage of fluid, and avoidance of complex mechanical parts, the latter to insure certainty of operation and to enable the device to be constructed and maintained at minimum cost, will be best understood from the following description when read in the light of the accompanying drawing of one embodiment of the invention, the scope of which latter will be more particularly pointed out in the appended claims.

In the drawing:—

Figure 2:
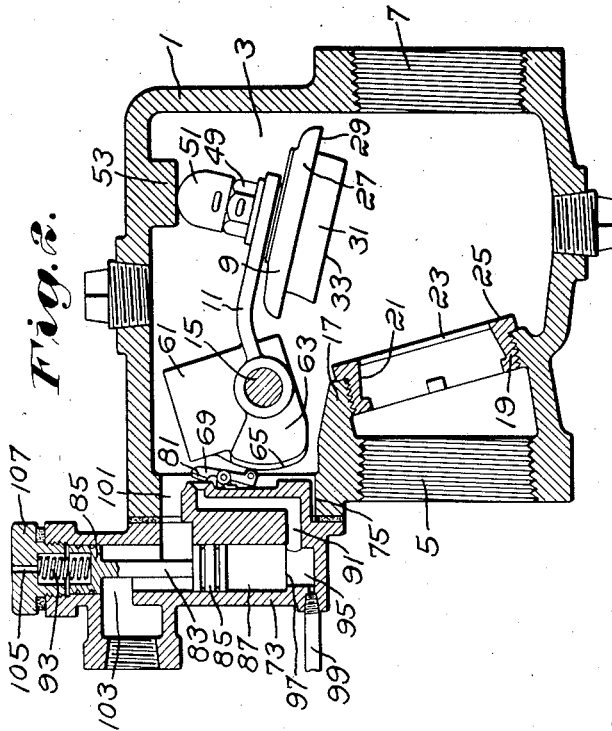
Fig. 2 is a longitudinal vertical section of the valve according to Fig. 1, with the parts in a different position.

Referring to the drawing, I have shown a casing 1 formed to provide a chamber 3, the casing having openings 5 and 7 which are tapped for connection to suitable piping and respectively form a fluid inlet and a fluid outlet for the chamber 3.

As illustrated, fluid communication between the inlet connection 5 and outlet connection 7 may be established and interrupted by a valve, which valve herein constitutes a flow responsive device and comprises a head indicated in its entirety at 9 mounted on an arm 11, the latter formed with perforations or recesses 13 for receiving trunnions projecting inwardly from the opposite lateral walls of the casing, one of which trunnions is indicated at 15, the construction in this latter respect, if desired, being identical with that shown in my above mentioned co-pending application.

Herein, the casing is formed with a partition 17 adjacent the inlet opening 5, said partition having a screw threaded opening for receiving a bushing 19, this bushing having a tapered opening 21 which terminates in an annular narrow edge portion 23 contiguous to a flat annular end surface 25. As shown, the valve head 9 comprises a flange portion 27 having a flat annular face 29 for seating on the flat annular end surface 25. The valve head further comprises a plug portion 31 adapted to enter the bore 21 of the bushing and fit the narrow edge portion 23 thereof with a minimum clearance. As shown, the plug portion is a segment of a toroid concentric with the axes of the trunnions 15 on which the swinging arm 11 is fulcrumed. Herein, the end face 33 of the plug 31 is parallel to the annular face 29 of the valve flange 27, with the result that when the valve moves in valve-opening direction past its dotted line position, shown by Fig. 1, fluid from the inlet 5 is permitted to pass the valve through a narrow, crescent-shaped slot which, upon continued movement of the valve in valve-opening direction, gradually progressively enlarges as the plug progressively moves out of contact with its seat 23.

The plug 31 and associated parts provide that fluid communication between the inlet and outlet connections of the casing 3 is not established by water hammer or slight fluctuations of pressure in the system. The progressive opening of the valve, caused by the toroidal surface of the plug gradually moving out of contact with the valve seat 23, when pressure at the outlet side of the valve is relieved, results, once the plug begins to move out of contact with its valve seat, in the valve opening quickly.

The valve head, above described, conveniently may be made by molding it of suitable substance, such as hard rubber compound, commonly employed for valves. As shown, the body of the valve head is molded about a stud 35 having the flange head 37 and screw threaded shank 39, the shank from about midway its length to its end opposite the head 37 being of reduced diameter to provide a shoulder 41. Herein, the free end of the valve arm 11 has a perforation 43, formed to provide a shoulder 45, through which perforation the shank 39 of the stud 35 extends, the shoulder 41 of the shank abutting the shoulder 45 of the perforation, and the parts being so proportioned as to provide a space 47 between the adjacent faces of the valve arm and valve head. A nut 49 on the shank 39 holds the parts in assembled relation. As shown, the shank outwardly of the nut 49 carries a buffer 51 which may be made of the same material as the valve head. This buffer is adapted to contact with a stop member 53 formed on the upper wall of the casing 1.

Conveniently, the valve head 9 is provided with a small diameter perforation 55, passage of fluid through which is controlled by a check valve, the latter herein being in the form of a plate 57 on the upper side of the valve head. The plate 57 has a body portion which extends through the space 47 between the valve head and valve arm, this body portion being perforated to have a loose fit on the shank 39 so that the latter serves as a guide for the plate. The perforation 55 permits a slight flow of fluid through the valve when the pressure of the fluid in the piping connected to the inlet connection 5 rises, as would be the case, for example, if the system were supplied with water from city mains, while the check valve 57 prevents a back flow of this fluid. In cases where the valve is installed in systems in which the pressure does not vary, the perforation 55 and check valve 57, if desired, may of course be omitted.

Figure 3:
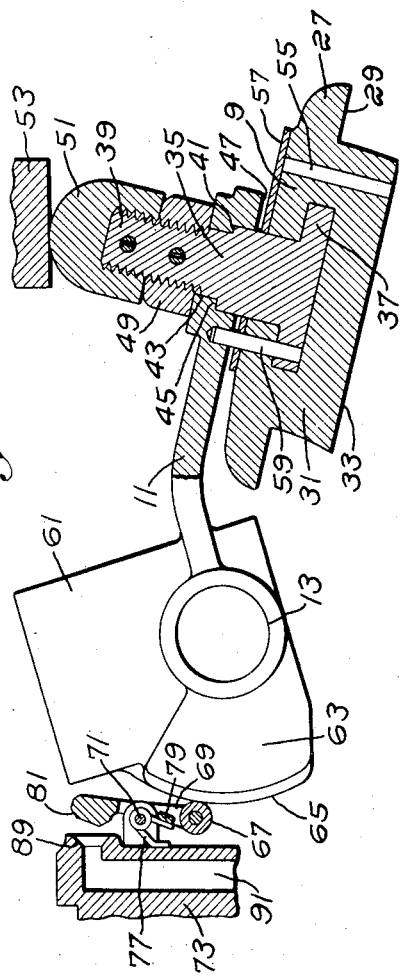
Fig. 3 is a detail on an enlarged scale with the valve head and associated parts in section.

As illustrated, for holding the valve head 9 in proper relation to the valve seats 23 and 25 on the bushing 19, and for holding the plate 57 in proper relation to the passage 55 through the valve head, a pin 59 is provided which, as shown by Fig. 3, extends through aligned perforations in the valve arm 11, plate 57, and valve 9. For securing durability, the pin 59 is shown as secured in a perforation in the flange head 37 of the stud, about which latter the valve head is molded.

As shown, the valve arm 11, at its upper side adjacent its fulcrum, is provided with a boss 61, which latter may contain a tilt-operated mercury switch, not claimed herein, the details of which are disclosed in my above mentioned copending application. As illustrated, the boss 61 is provided with the rearward extension 63 which, in conjunction with said boss and the parts contained therein, serves as a counter-weight for the valve head. Herein, the extension 63 is formed with a cam track 65 cooperating with a roller 67 on the end of a lever 69, which lever is fulcrumed at 71 on the closure 73 for an opening 75, the latter formed through the wall of the casing at the portion thereof which is in fluid communication with the outlet side of the flow operated valve. As shown, a spring 77 bears, at one end, against the inner wall of the closure 73, and, at its other end, against a lug 79 on the lever 69, so as to hold the roller 67 in contact with the cam track 65.

At its upper end the lever 69 is formed to provide a valve 81, herein provided for serving as a pilot valve to cause actuation of a fluid actuated main valve 83, which latter permits escape of fluid from the chamber 3 when the flow operated valve is open, this escaping fluid, if water, actuating a so-called water alarm, the latter commonly in the form of a turbine-actuated gong.

As shown, the valve 83 comprises a central stem carrying, at opposite ends thereof, piston heads 85 which herein are of the same diameter and are reciprocably mounted in a bore 87. This bore at its lower end is placed in communication with the seat 89 for the valve 81 by a passage 91, so that when the valve 81 is in its open position, as shown by Figs. 2 and 3, pressure fluid will be admitted from the chamber 3 to the lower end of the bore 87 to cause the valve 83 to be raised against the force of a compression spring 93, the latter constantly urging the valve toward its lowest position shown by Fig. 1. Herein, the lower end of the bore 87 is of reduced diameter, as shown at 95, to provide a shoulder 97, the latter being above the point of communication of the passage 91 with the bore 87 and affording a stop for limiting the downward movement of the valve 83. This lower reduced diameter portion of the bore is placed in communication with the atmosphere by a bleed pipe 99 communicating with the bore by a passage of smaller effective cross-sectional area than the effective cross-sectional area of the passage 91, with the result that there is available a unit pressure lifting the valve 83 less than the unit pressure of the fluid in the chamber 3. When the valve 81 is closed to interrupt communication of the passage 91 with the chamber 3, the fluid in the lower end of the bore 87 will be discharged therefrom through the bleed pipe 99, to permit the valve 83 to return to its lowermost position.

Figure 1:
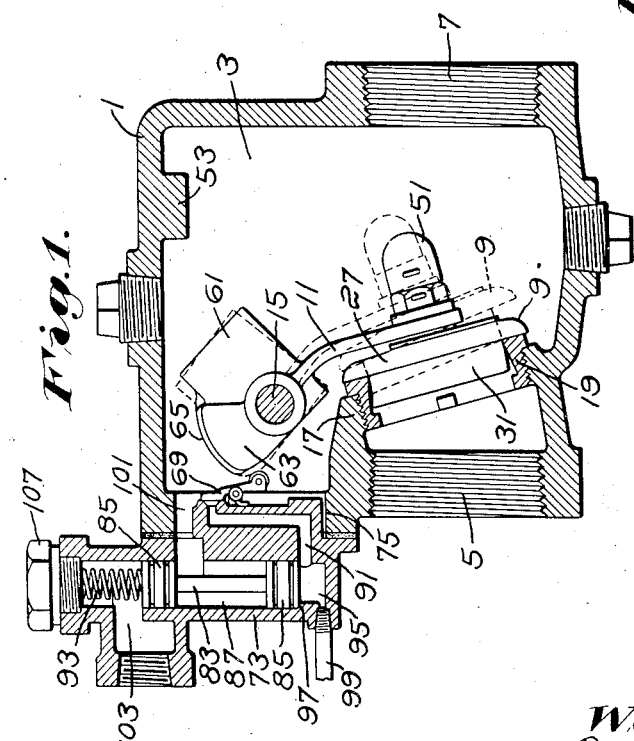
Fig. 1 is a longitudinal vertical section, with parts in elevation, of an alarm valve constructed according to the invention.

As shown, the intermediate portion of the bore 87, that is to say, the portion thereof between the piston heads 85, in all positions of the valve 83 is placed in communication with the chamber 3 by a passage 101. A second passage 103 communicates with the bore 87 at a point above the point of communication of the passage 101 with said bore. These passages are placed in communication when the valve 83 is in its raised position, as shown by Fig. 2, while such communication is interrupted when the valve is in its lower position, as shown by Fig. 1, with the result that the water alarm will be actuated when the parts are in the position shown by Fig. 2, and will not be actuated when the parts are in the position shown by Fig. 1.

Preferably the vertical width of the port through which the passage 103 communicates with the bore 87 is not greater than the vertical width of the upper piston head 85 of the valve 83, so that said upper head 85 will have entered the portion of the bore 87 above this port when communication is established between the passages 101 and 103, with the result that upward movement of the valve will be cushioned by trapped air in the upper portion of the bore. The degree of cushioning is controlled by a small diameter bore 105 (Fig. 2) extending through the plug 107 closing the upper end of the bore 87. The bore 105 also prevents the formation of a vacuum in the upper end of the bore 87 when the valve 83 is permitted to move downwardly, and, further, assures that when water is the fluid conveyed by the system, no water will be trapped in the upper end of the bore 87 to prevent full opening movement of the valve 83.

It will be understood that the device herein described may be used in various situations in connection with distributing systems for various fluids. As shown, it may be employed in place of the so-called main automatic sprinkler valve heretofore commonly used at the main water entrance for the sprinkler supply system of a building. It may also be used in conjunction with the tilt-operated switch as a so-called supervisory alarm valve for branch supplies to separate sections of the sprinkler system, in which case the water alarm features may be omitted. The valve is particularly adapted, when the tilt-operated switch is employed, for use in connection with branches of a sprinkler system supplying sprinkler heads in different rooms, in which case the valve, which may be made small, may actuate annunciators at a central point, remote from the rooms, for indicating that the sprinkler heads in particular rooms are discharging water.

In operation the device will be inserted in the desired pipe line, and when the pressure is relieved at the outlet side of the casing 1, say when a sprinkler head opens, the valve 9 will suddenly open, and will be maintained in open position by the flow of water through the casing. As has hereinbefore been referred to, the movement of the valve plug 31 progressively out of contact with the valve seat 23 results in the valve 9 opening quickly. Normally, the face 29 of the flange 27 of the valve will be against the valve seat 25, and will thus insure a fluid tight valve. Upon occurrence of water hammer, the face 29 will unseat, but the valve will remain in closed condition due to the sliding contact of the plug 31 with the seat 23. Upon backward surge of the water hammer, the valve face 29 will again seat itself, the restricted passage 55 through the valve affording sufficient relief of pressure, if necessary, to insure this action, and, as the pressure differentials under these conditions may be very slight, preferably the valve plate 27 is of light weight so as to open readily and afford a so-called "feather" valve action. By suitably proportioning the effective cross-sectional area of the valve passage 55, a restricted flow of fluid through it is obtained, with the result of cushioning the closing movement of the valve when movement of the latter is caused by water hammer.

It will be understood that although but one specific embodiment of the invention has been illustrated and described, wide deviations may be made from this embodiment without departing from the spirit of the invention.

I claim:

1. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, said valve mounted for swinging movement and having a plug with a toroidal surface concentric with the axis about which said valve is swung, and an internal valve seat for contacting with said surface of said plug throughout a circumference thereof for a substantial extent of movement thereof in valve-opening direction.

2. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, said valve mounted for swinging movement and having a plug with a toroidal surface concentric with the axis about which said valve is swung, and an internal valve seat for contacting with said surface of said plug throughout a circumference thereof for a substantial extent of movement thereof in valve-opening direction, said surface of said plug and said valve seat being relatively formed to cause said surface to move progressively out of contact with said valve seat upon further movement of said valve.

3. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, said valve mounted for swinging movement and having a plug with a toroidal surface concentric with the axis about which said valve is swung, and an internal valve seat for contacting with said surface of said plug throughout a circumference thereof for a substantial extent of movement thereof in valve-opening direction, that edge of said surface of said plug which last moves out of contact with said valve seat being at an angle to the corresponding edge of the latter when said surface is moving out of contact with said valve seat.

4. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, means forming an internal narrow annular valve seat, a valve mounted for swinging movement about a fulcrum axis which is at one side of said valve seat and approximately in the plane of said valve seat, said valve having a plug formed with a toroidal surface adapted to fit said annular valve seat throughout the circumference thereof for a substantial extent of movement of said valve, said plug terminating at one end in said plane when said valve is entirely closed and terminating at its other end in a plane which lies at one side of said fulcrum when said valve is about to open.

5. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, means enforcing a predetermined direction of movement of said valve, said valve having an annular poppet portion and a plug portion, an annular valve seat for the poppet portion of said valve, said valve mounted for free movement in response to pressure conditions at opposite sides thereof for causing said plug portion to enter and withdraw from the opening defined by said annular valve seat, an internal annular valve seat for said plug portion arranged to contact therewith throughout a circumference thereof for a substantial extent of movement of said valve when said poppet portion thereof is out of contact with its seat, that end of said plug portion which is opposite said poppet portion being at an angle to said seat for the latter as said plug portion is withdrawing from said opening.

6. In an alarm controlling device for sprinkler systems, a casing having an outlet and an inlet respectively for connection to the sprinkler heads and the water supply therefor, a flow operated alarm controlling valve in said casing mounted for swinging movement for establishing and interrupting communication between said inlet and outlet, said valve having a poppet portion and a plug portion, an annular valve seat for the poppet portion of said valve, and an internal annular valve seat for said plug portion arranged to contact therewith throughout a circumference thereof for a substantial extent of movement of said valve when said poppet portion thereof is out of contact with its seat, the end of the surface of said plug portion which contacts with said internal valve seat lying in a plane which is at an angle to said valve seat for said poppet portion as said surface is moving out of contact with said internal valve seat.

7. In an alarm controlling device for sprinkler systems, a casing having an outlet and an inlet respectively for connection to the sprinkler heads and the water supply therefor, a flow operated alarm controlling valve in said casing for establishing communication between said inlet and outlet, said valve having a poppet portion and a toroidal plug portion, a valve seat for said poppet portion, said valve mounted for swinging movement about an axis lying substantially in the plane of said valve seat at one side thereof, said toroidal plug portion being concentric with said axis, and an internal annular valve seat for said plug portion adapted to contact therewith throughout a circumference thereof for a substantial extent of movement of said valve when said poppet portion thereof is out of contact with its seat.

8. In an alarm controlling device for sprinkler systems, a casing having an outlet and an inlet respectively for connection to the sprinkler heads and the water supply therefor, a flow operated alarm controlling valve in said casing for establishing communication between said inlet and outlet, said valve having a poppet portion and a toroidal plug portion, a valve seat for said poppet portion, said valve mounted for swinging movement about an axis lying substantially in the plane of said valve seat at one side thereof, said toroidal plug portion being concentric with said axis, and an internal annular valve seat for said plug portion adapted to contact therewith throughout a circumference thereof for a substantial extent of movement of said valve when said poppet portion thereof is out of contact with its seat, said internal valve seat and plug portion being relatively formed to cause the latter to move progressively out of contact with the former.

9. In a device of the character described, a casing having an inlet and an outlet, a flow controlled valve for establishing and interrupting communication between said inlet and outlet, said valve mounted for swinging movement and having provision for substantial movement in valve-opening direction before establishing communication between said inlet and outlet, and an alarm valve actuated by movement of said first mentioned valve to permit escape of fluid from said casing after said first mentioned valve is opened.

10. In a device of the character described, a casing having an inlet and an outlet, a flow controlled valve for establishing and interrupting communication between said inlet and outlet, said valve mounted for swinging movement and having provision for substantial movement in valve-opening direction before establishing communication between said inlet and outlet, an alarm valve, and a cam actuated by movement of said first mentioned valve for opening said alarm valve to permit escape of fluid from said casing after said first mentioned valve is opened.

11. In a device of the character described, a casing having an inlet and an outlet, a flow controlled valve for establishing and interrupting communication between said inlet and outlet, said valve comprising a swinging arm carrying a valve head, the latter having provision for substantial movement in valve-opening direction before establishing communication between said inlet and outlet, a cam carried by said arm at the opposite side of its fulcrum from said valve head, and an alarm valve in said casing actuated into open position by said cam after said valve head establishes communication between said inlet and outlet.

12. In a device of the character described, a casing having an inlet and an outlet, a flow controlled valve for establishing and interrupting communication between said inlet and outlet, said valve comprising a swinging arm carrying a valve head, the latter having provision for substantial movement in valve-opening direction before establishing communication between said inlet and outlet, a cam carried by said arm at the opposite side of its fulcrum from said valve head, and a pivoted alarm valve in said casing actuated into open position by said cam after said valve head establishes communication between said inlet and outlet.

13. In a device of the class described, a casing having an inlet and an outlet, a flow actuated valve in said casing comprising a swinging arm carrying a valve head for establishing communication between said inlet and outlet, a detachable part for said casing carrying a fluid actuated valve and a pilot valve, the latter for controlling movement of said fluid actuated valve and actuated by swinging movement of said arm.

14. In a device of the class described, a casing having an inlet and an outlet, a flow actuated valve in said casing comprising a swinging arm carrying a valve head for establishing communication between said inlet and outlet, a detachable part for said casing carrying a fluid actuated valve and a pilot valve, the latter for controlling movement of said fluid actuated valve and actuated by swinging movement of said arm, and ports and passages controlled by said pilot valve and fluid actuated for causing fluid from said casing to actuate said pilot valve into open position to permit escape of fluid from said casing when said flow actuated valve is opened.

15. In a device of the class described, a casing having an inlet and an outlet, a flow actuated valve in said casing comprising a swinging arm carrying a valve head for establishing communication between said inlet and outlet, a detachable part for said casing carrying a fluid actuated valve and a pilot valve, the latter for controlling movement of said fluid actuated valve and actuated by swinging movement of said arm, and a cam on said swinging arm for actuating said pilot valve for causing opening of said fluid actuated valve to permit escape of fluid from said casing when said flow actuated valve is opened.

16. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, said valve having a plug portion with an exterior peripheral lateral surface, an internal valve seat having a surface surrounding said exterior surface of said plug portion for contacting therewith, means supporting said valve for free movement axially of said plug portion thereof; said internal valve seat and said exterior surface of said plug portion being so formed as to be in contact throughout a circumference of said plug portion for a substantial extent of movement of said valve in valve opening direction for maintaining interruption of communication between said inlet and outlet during such movement, and also being so formed as to cause said exterior surface of said plug portion to move progressively out of contact with said internal valve seat upon further movement of said valve in valve opening direction.

17. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, said valve having a plug portion with an exterior peripheral lateral surface, an internal valve seat having a surface surrounding said exterior surface of said plug portion for contacting therewith throughout a circumference thereof, means supporting said valve for free movement enabling said exterior surface of said plug portion to withdraw entirely from said internal valve seat, said plug portion having a transverse end surface defining that edge of said exterior surface of said plug portion which last withdraws from said valve seat, said transverse surface being so formed as to cause said edge of said exterior surface of said plug portion to withdraw from said internal valve seat first at one side of the latter and progressively withdraw from said side to the opposite side thereof.

18. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, said valve having a poppet portion and also a plug portion with an exterior peripheral lateral surface, a valve seat for said poppet portion, an internal valve seat having a surface surrounding said exterior surface of said plug portion for contacting therewith, means supporting said valve for free movement axially of said plug portion thereof; said internal valve seat and said exterior surface of said plug portion being so formed as to be in contact throughout a circumference of said plug portion for a substantial extent of movement of said valve in valve opening direction after said poppet portion lifts from its valve seat for maintaining interruption of communication between said inlet and outlet during such movement, and also being so formed as to cause said exterior surface of said plug portion to move progressively out of contact with said internal valve seat upon further movement of said valve in valve opening direction.

19. In an alarm controlling device for sprinkler systems, a casing having an outlet and an inlet respectively for connection to the sprinkler heads and the water supply therefor, a flow operated alarm controlling valve in said casing for establishing and interrupting communication between said inlet and outlet, said valve having a poppet portion and also a plug portion with an exterior peripheral lateral surface, a valve seat for said poppet portion, an internal valve seat having a surface surrounding said exterior surface of said plug portion for contacting therewith, means supporting said valve for free movement axially of said plug portion thereof; said internal valve seat and said exterior surface of said plug portion being so formed as to be in contact throughout a circumference of said plug portion for a substantial extent of movement of said valve in valve opening direction for maintaining interruption of communication between said inlet and outlet during such movement, and also being so formed as to cause said exterior surface of said plug portion to move progressively out of contact with said internal valve seat upon further movement of said valve in valve opening direction.

20. In a device of the class described, a casing, a valve in said casing having a poppet portion and a plug portion, valve seats in said casing for said portions, said plug portion remaining in contact with its seat until after said poppet portion leaves its seat, an alarm, means operated in response to opening movement of said valve after said plug portion is moved from in contact with its seat for actuating said alarm, and restricted conduit means establishing communication between the inlet and outlet sides of said valve.

21. In a device of the class described, a casing, a valve in said casing having a poppet portion and a plug portion, valve seats in said casing for said portions, said plug portion remaining in contact with its seat until after said poppet portion leaves its seat, an alarm, means operated in response to opening movement of said valve after said plug portion is moved from in contact with its seat for actuating said alarm, and restricted conduit means formed in said valve for establishing communication between the inlet and outlet sides of said valve.

22. In a device of the class described, a casing, a valve in said casing having a poppet portion and a plug portion, valve seats in said casing for said portions, said plug portion remaining in contact with its seat until after said poppet portion leaves its seat, an alarm, means operated in response to opening movement of said valve after said plug portion is moved from in contact with its seat for actuating said alarm, restricted conduit means formed in said valve for establishing communication between the inlet and outlet sides of said valve, and a check valve carried by said valve for preventing flow through said conduit means from the outlet to the inlet sides of said valve.

WALTER M. S. KILGOUR.